United States Patent [19]

Abe et al.

[11] Patent Number: 5,280,060

[45] Date of Patent: Jan. 18, 1994

[54] THERMOPLASTIC RESIN COMPOSITION CONTAINING A FLUIDITY MODIFIER

[75] Inventors: Hiroomi Abe, Chiba; Takeshi Fujii, Sodegaura; Kiyoshi Mitsui, Ichihara, all of Japan

[73] Assignee: Sumitomo Chemical Company, Limited, Osaka, Japan

[21] Appl. No.: 983,252

[22] Filed: Nov. 30, 1992

Related U.S. Application Data

[63] Continuation of Ser. No. 734,452, Jul. 23, 1991, abandoned.

[30] Foreign Application Priority Data

Aug. 2, 1990 [JP] Japan ................................ 2-206306

[51] Int. Cl.$^5$ ............................................... C08K 5/16
[52] U.S. Cl. ............................... 524/234; 524/90; 524/112; 524/236; 524/252; 524/211; 524/314
[58] Field of Search ............... 524/112, 234, 236, 251, 524/252, 257, 91, 100

[56] References Cited

U.S. PATENT DOCUMENTS

| | | | |
|---|---|---|---|
| 3,449,287 | 6/1969 | Fairfull et al. | 524/211 |
| 3,692,730 | 9/1972 | Sims | 524/252 |
| 4,822,836 | 4/1989 | Wroczynski | 524/300 |
| 5,071,896 | 12/1991 | Heinz et al. | 524/212 |

FOREIGN PATENT DOCUMENTS

| | | |
|---|---|---|
| 0436894 | 7/1991 | European Pat. Off. . |
| 3423291 | 1/1986 | Fed. Rep. of Germany . |
| 28089 | 7/1972 | Japan . |
| 53-14755 | 2/1978 | Japan . |
| 3219622 | 9/1988 | Japan . |

OTHER PUBLICATIONS

Plastics Additives Handbook, R. Gachter and H. Muller, Hanser Publishers, Munich, Vienna New York, "Stabilizers, Processing Aids, Plasticizers, Fillers, Reinforcements, Colorants for Thermoplastics", pp. 304–305.

Plastics Manuf., vol. 84, 1976, p. 45, abstract No. 84:45282 & JP Kokai 75, 114,452.

Chemical Abstracts, vol. 96, No. 24, Jun. 14, 1982, Columbus, Ohio, US; abstract No. 200782a, "Polyamides with improved moldability", p. 49; col. 1 & JP-A-57 018 756 (Kokai Tokkyo Koho) Jan. 30, 1982.

Chemical Abstracts, vol. 83, No. 16, Oct. 20, 1975, Columbus, Ohio, US; abstract No. 132634h, "Polyamides with superior viscosity stability", p. 51; col. 2; & JP-A-49 038 114 (Teijin Ltd), Oct. 15, 1974.

*Primary Examiner*—Paul R. Michl
*Assistant Examiner*—Tae H. Yoon
*Attorney, Agent, or Firm*—Stevens, Davis, Miller & Mosher

[57] ABSTRACT

A thermoplastic resin composition comprises:
  100 parts by weight of at least one polyamide resin, and
  0.01 to 20 parts by weight of at least one fluidity modifier selected from the group consisting of:
  Succinic anhydride,
  hexamethylenetetramine and
  1,12-diaminododecane.

2 Claims, No Drawings

THERMOPLASTIC RESIN COMPOSITION CONTAINING A FLUIDITY MODIFIER

This application is a continuation of application Ser. No. 07/734,452, filed Jul. 23, 1991, now abandoned.

The present invention relates to a novel thermoplastic resin composition suited for producing a molded article by injection molding.

More specifically, it relates to a thermoplastic resin composition having an excellent moldability which comprises a polyamide resin and additives.

Polyamide resins have a high heat resistance, stiffness, strength and oil resistance and other desirable properties. They, one of the so-called engineering resins, have been widely applied to the fields of automobile parts, electric parts, electronic parts, etc. And the improvement in their moldability is expected to further widen their application.

In order to improve the fluidity of polyamide resin compositions to facilitate the molding, it is known that addition of lubricants (e.g. higher aliphatic acids, higher alcohols, aliphatic diesters and aliphatic monoamines) or fluidity modifiers (e.g. sulfoneamide) has been tried.

However, the known fluidity modifier is required to be added in a large amount for improving the fluidity. It causes the problems of degradation of the quality of the molded product and bleeding of the modifier from the molded product.

Use of the conventional fluidity modifier for improving the moldability of polyamide resin compositions accompanies the problems mentioned above. Thus, it has long been desired to develop a technique which improves the moldability by adding an extremely small amount of fluidity modifier without causing the problems of degradation of the quality of the molded product, bleeding of the modifier from the molded product and contamination of mold by the modifier.

An object of the present invention is to provide an easily moldable polyamide resin composition containing one or more fluidity modifiers.

According to the present invention, there is provided a thermoplastic resin composition which comprises:
100 parts by weight of at least one polyamide resin, and
0.01 to 20 parts by weight of at least one fluidity modifier selected from the group consisting of:
a carboxylic acid having at least two carboxyl groups in the molecule,
a derivative of a carboxylic acid having at least two carboxyl groups in the molecule,
an amine having at least two nitrogen atoms in the molecule,
urea, and
a derivative of urea.

Preferably, at least one of adipic acid, succinic anhydride, hexamethylenediamine, hexamethylenetetramine, 1,12-diaminododecane and urea is selected as the fluidity modifier. Also preferably, poly-ε-caprolactam or polyhexamethyleneadipamide is selected as the polyamide resin.

The polyamide resin usable in the present invention refers to lactams having a ring of three or more members, polymerizable ω-amino acids and polyamides obtained by polycondensing a dibasic acid and a diamine. Specifically, it includes polymers of ε-caprolactam, aminocaproic acid, enantholactam, 7-aminoheptanoic acid or 11-aminoundecanoic acid; polymers obtained by polycondensing a diamine (e.g. hexamethylenediamine, nonamethylenediamine, undecamethylenediamine, dodecamethylenediamine, meta-xylylenediamine) and a dicarboxylic acid (e.g. terephthalic acid, isophthalic acid, adipic acid, sebacic acid, dodecane dibasic acid, glutaric acid); and the copolymers thereof.

Specific examples of the polyamide resin are aliphatic polyamide (e.g. polyamide 6, polyamide 66, polyamide 610, polyamide 11, polyamide 12, polyamide 612), aromatic polyamide (e.g. polyhexamethylenediamide terephthalamide, polyhexamethylenediamine isophthalamide, polyamides containing xylylene group), the mixtures thereof and the copolymers thereof.

The fluidity modifier of the present invention includes a carboxylic acid having at least two carboxyl groups in the molecule, a derivative of a carboxylic acid having at least two carboxyl groups in the molecule, an amine having at least two nitrogen atoms in the molecule, urea, and a derivative of urea.

Specific examples of the carboxylic acid having at least two carboxyl groups in the molecule and the derivative thereof are succinic acid, glutaric acid, adipic acid, pimelic acid, suberic acid, azelaic acid, nonamethyl dicarboxylic acid, undecamethylene dicarboxylic acid, dl-methylsuccinic acid, methylmalonic acid, ethylmalonic acid, dimethylmalonic acid, tetramethylsuccinic acid, vinaconic acid, d-camphoric acid, acetylmalic anhydride, isovaleric anhydride, isobutyric anhydride, succinic anhydride, heptanoic anhydride, methylsuccinic anhydride, butyric anhydride, d-tartaric acid, l-tartaric acid, d-sugar acid, mucic acid, l-malic acid, dioxytartaric acid, dl-citramalic acid, dl-bromosuccinic acid, calcium l-malate, dl-1,2-dibromosuccinic acid, 1,4-pyrone-2,6-dicarboxylic acid, diethyl l-malate, DL-aspartic acid, dl-isocamphoric acid, diglycolic acid, 1,1-cyclopropanedicarboxylic acid, oxalic acid, and the like.

Specific examples of the amine having at least two nitrogen atoms in the molecule are hexamethylenediamine, hexamethylenetetramine, polyalkylenepolyamine, phenylenediamine, 4,4'-diaminodiphenyl compounds, m-xylylenediamine, toluidine derivatives of aniline, N-alkylanilines or N-phenylanilines, and the like.

Specific examples of urea and the derivative of urea are urea, methylurea, sym-diethylurea, ethylurea, sym-dimethylurea, unsym-diethylurea, acetylurea, acetylmethylurea, sym-ethylphenylurea, phenylurea, sym-diphenylurea, benzylurea, tetraphenylurea, benzoylurea, p-ethoxyphenylurea, ethyleneurea, thiourea, allylthiourea, sym-dimethylthiourea, sym-diethylthiourea, sym-diphenylthiourea, phenylthiourea, benzylthiourea, s-benzylisothiourea, benzylisothiourea, and the like.

The thermoplastic resin composition of the present invention comprises 100 parts by weight of the above-mentioned polyamide resin, and 0.01 to 20 parts by weight of at least one fluidity modifier mentioned above.

Incorporation of the fluidity modifier in an amount less than 0.01 part does not sufficiently improve the moldability of the thermoplastic resin composition. In contrast, incorporation of the fluidity modifier in an amount more than 20 parts undesirably deteriorates the impact resistance and other properties of the molded product.

The present invention is explained below with reference to the following examples. These examples are presented merely to illustrate some embodiments of the present invention and should not be interpreted to limit the scope of the present invention thereto.

EXAMPLE 1-5

Nylon-6 (Unitika Nylon A1020BRT, commercially available from UNITIKA, LTD.) was used as the polyamide resin.

The polyamide resin has a relative viscosity of 3.4 when determined by 98% sulfuric acid method according to JIS K-6810. Neutralization titration showed that the resin has 42 mmole/kg of amino group and 42 mmole/kg of carboxyl group as the terminal functional groups.

The polyamide resin and the fluidity modifiers listed in Table 1 were mixed. Then, the resulting mixture was kneaded with Laboplastmill manufactured by Toyo Seiki, Co, Limited to obtain a kneaded product. The kneading was carried out at a jacket temperature of 250° C. for a kneading time of 5 minutes with adjusting the rotation of rotor to 50 r.p.m.

The obtained kneaded product was pulverized and measured for melt flow rate. The measurement was conducted at 230° C. under a load of 2.16 kg.

COMPARATIVE EXAMPLE 1

The melt flow rate of the polyamide resin used in Examples 1-5 was determined in the same manner as in Examples 1-5.

Table 1 shows the results of Examples 1-5 and Comparative Example 1.

The data of melt flow rate in Table 1 demonstrate that the thermoplastic resin compositions of the present invention have an excellent moldability due to its remarkably improved fluidity.

TABLE 1

| | Fluidity modifier | Content of fluidity modifier (part by weight) | Melt flow rate (g/10 minutes) |
|---|---|---|---|
| Example 1 | Succinic anhydride | 0.5 | 57 |
| Example 2 | Adipic acid | 0.5 | 52 |
| Example 3 | Hexamethylenediamine | 0.5 | 35 |
| Example 4 | Hexamethylenetetramine | 0.5 | 11 |
| Example 5 | Urea | 0.5 | 54 |
| Comparative Example 1 | None | — | 4.2 |

What is claimed is:

1. A thermoplastic resin composition consisting essentially of:
   100 parts by weight of at least one polyamide resin selected from the group consisting of:
   poly-ε-caprolactam, and
   polyhexamethyleneadipamide, and
   0.01 to 20 parts by weight of at least one fluidity modifier selected from the group consisting of:
   hexamethylenetetramine, and
   1,12-diaminododecane.

2. A method for improving the fluidity of polyamide resin compositions to facilitate their molding which comprises adding to 100 parts by weight of at least one polyamide resin selected from the group consisting of:
   poly-ε-caprolactam and
   polyhexamethyleneadipamide,
   0.01 to 20 parts by weight of at least one fluidity modifier selected from the group consisting of:
   hexamethylenetetramine, and
   1,12-diaminododecane.

* * * * *